(12) United States Patent
Chiu et al.

(10) Patent No.: US 9,883,178 B2
(45) Date of Patent: Jan. 30, 2018

(54) METHOD FOR MEASURING PERFORMANCE PARAMETERS AND DETECTING BAD PIXELS OF AN INFRARED FOCAL PLANE ARRAY MODULE

(71) Applicant: Unlimited Optics Corp., Taoyuan (TW)

(72) Inventors: Yu-Chiao Chiu, Taoyuan (TW); Le-Yen Chang, Taoyuan (TW); Yim-Min Chen, Taoyuan (TW)

(73) Assignee: UNLIMITED OPTICS CORP., Taoyuan (TW)

( * ) Notice: Subject to any disclaimer, the term of this patent is extended or adjusted under 35 U.S.C. 154(b) by 273 days.

(21) Appl. No.: 14/736,076

(22) Filed: Jun. 10, 2015

(65) Prior Publication Data
US 2016/0234489 A1 Aug. 11, 2016

(30) Foreign Application Priority Data
Jun. 23, 2014 (TW) .............................. 103121502 A

(51) Int. Cl.
*H04N 17/00* (2006.01)
*G06K 9/62* (2006.01)
*G06T 7/00* (2017.01)
*H04N 5/33* (2006.01)
*H04N 5/367* (2011.01)

(52) U.S. Cl.
CPC .......... *H04N 17/002* (2013.01); *G06K 9/6215* (2013.01); *G06T 7/0002* (2013.01); *H04N 5/367* (2013.01); *G06T 2207/10048* (2013.01); *G06T 2207/30168* (2013.01); *H04N 5/33* (2013.01)

(58) Field of Classification Search
None
See application file for complete search history.

(56) References Cited

U.S. PATENT DOCUMENTS

| | | | | |
|---|---|---|---|---|
| 4,298,887 A | * | 11/1981 | Rode | H04N 5/2176 264/515 |
| 4,795,904 A | * | 1/1989 | Richards | H04N 5/33 250/214 DC |
| 5,113,263 A | * | 5/1992 | Audaire | H01L 27/14856 348/303 |

(Continued)

*Primary Examiner* — Mohammad J Rahman
(74) *Attorney, Agent, or Firm* — Lynette Wylie; Apex Juris, PLLC.

(57) ABSTRACT

A method for measuring performance parameters of an infrared focal plane array (IRFPA) module has steps of capturing continuous digital images from the IRFPA module, performing image division on each of the continuous digital images, and measuring multiple performance parameters of each divided digital image, including signal transmission function, a temporal noise equivalent temperature difference, a spatial noise equivalent temperature difference, non-uniformity and operability, thereby increasing accuracy in measuring the performance parameters of the IRFPA module. Also, a method for detecting bad pixels of an IRFPA module includes a gain value method, an offset value method, a temporal noise method and a spatial noise method, is applicable to the IRFPA module with more than two response areas, and avoids incorrect detection to treat pixels in different response areas as bad pixels.

12 Claims, 22 Drawing Sheets

(56) References Cited

U.S. PATENT DOCUMENTS

| | | | | |
|---|---|---|---|---|
| 5,264,940 | A * | 11/1993 | Komiya | H04N 5/235 348/229.1 |
| 5,363,208 | A * | 11/1994 | Ogino | H04N 1/40037 347/131 |
| 5,502,482 | A * | 3/1996 | Graham | G06T 7/20 348/140 |
| 5,600,369 | A * | 2/1997 | Cazaux | H01L 27/14831 257/E27.154 |
| 5,925,880 | A * | 7/1999 | Young | H04N 5/33 250/208.1 |
| 5,925,883 | A * | 7/1999 | Woolaway, II | H04N 3/1525 250/332 |
| 6,130,713 | A * | 10/2000 | Merrill | G01S 7/487 348/297 |
| 6,806,469 | B2 * | 10/2004 | Kerr | G06T 1/20 250/330 |
| 6,965,416 | B2 * | 11/2005 | Tsuchiya | H04N 1/4092 348/606 |
| 7,075,569 | B2 * | 7/2006 | Niikawa | H04N 5/217 348/218.1 |
| 8,319,862 | B2 * | 11/2012 | Mangoubi | G06T 5/50 348/251 |
| 8,373,757 | B1 * | 2/2013 | Nguyen | H04N 5/33 250/252.1 |
| 9,462,945 | B1 * | 10/2016 | Barriga | A61B 3/152 |
| 2002/0159101 | A1 * | 10/2002 | Alderson | H04N 5/365 358/504 |
| 2003/0021474 | A1 * | 1/2003 | Hunter | H04N 9/045 382/167 |
| 2003/0198400 | A1 * | 10/2003 | Alderson | H04N 5/33 382/274 |
| 2004/0247175 | A1 * | 12/2004 | Takano | H04N 13/0048 382/154 |
| 2006/0114272 | A1 * | 6/2006 | Taniguchi | G08G 1/166 345/690 |
| 2010/0172567 | A1 * | 7/2010 | Prokoski | A61B 5/0064 382/132 |
| 2013/0147966 | A1 * | 6/2013 | Kostrzewa | H04N 5/3655 348/164 |
| 2014/0270563 | A1 * | 9/2014 | Bailey | G06T 5/005 382/254 |

* cited by examiner

METHOD FOR MEASURING PERFORMANCE PARAMETERS AND DETECTING BAD PIXELS OF AN INFRARED FOCAL PLANE ARRAY MODULE

BACKGROUND OF THE INVENTION

1. Field of the Invention

The present invention relates to a method for measuring performance parameters of an infrared focal plane array module and a method for detecting bad pixels of an infrared focal plane array module, and, more particularly, to a method with enhanced accuracy in measuring performance parameters of an infrared focal plane array module and a detection method capable of accurately identifying bad pixels.

2. Description of the Related Art

Infrared light is invisible to the human eyes while the energy of infrared light radiated from an object can be measured by an infrared detector. The voltage values and current values obtained from the measurement of the infrared detector can be converted into a gray level image or a virtual color image to be displayed on a display for the human eyes to see. Although visible light images can be seen by the human eyes only when there is sufficient background light source, instead of being subject to limitations demanded by background light source or surrounding weather condition, clear infrared images can be obtained by using an infrared detector to receive energy of infrared light radiated from an object. With reference to FIG. 12, a common and prevailing way of using an infrared imaging camera 81 is to connect the infrared imaging camera 81 to a computer 82. The infrared imaging camera 81 faces an object 83. The computer 82 has an analog image acquisition card (not shown) equipped with an 8-bit NTSC (National Television System Committee) interface for rapidly acquiring infrared images of the object 83 taken by the infrared imaging camera 81, which can be used for measurement of performance parameters of the infrared imaging camera 81 and detection of bad pixels in the infrared images.

An infrared detector, such as an infrared focal plane array, embedded in the infrared imaging camera 81 is formed by an arrangement of multiple pixels. When the infrared detector performs infrared detection of the object 83, such as a flat black body field, because infrared signals radiated from the object 83 are rather accurate and uniform, responsivity values from the output of each pixel in the infrared focal plane array should be identical. In reality, the responsivity values from the output of each pixel in the infrared focal plane array are not uniform for the sake of the semiconductor manufacturing process or the nature of semiconductors. With reference to FIGS. 13 and 14, an original image of an infrared focal plane array is shown and has two different response areas. The dark gray areas on a left side and an upper left corner of FIG. 13 and on an upper portion of FIG. 14 have lower responsivity values. The light gray areas on the lower right corner of FIG. 13 and on the lower left corner of FIG. 14 have higher responsivity values. Clustered bad pixels, single bad pixel and rows of bad pixels are also marked on FIGS. 13 and 14. The different response areas (with higher responsivity values and lower responsivity values) and bad pixels all increase spatial noise and temporal noise of the infrared focal plane array and affect imaging quality of the infrared focal plane array to result in errors in assessment and analysis of performance index parameters, such as minimum resolvable temperature difference, spatial resolution, noise equivalent temperature difference, operability and the like.

Currently, methods for defining bad pixels include offset value method, extreme value method and gain value method. The offset value method is based on an offset table generated by applying two-point correction to the infrared focal plane array and defines a pixel as a bad pixel when an offset value of the pixel is beyond a percentage range of a mean value of the offset table (e.g. ±30%). The offset value method is not appropriate for infrared focal plane array with two or more than two response areas. With reference to FIG. 15A, a histogram defining a relationship between offset value and number of pixel is shown. Any pixel with an offset value beyond ±30% of the mean value (0.7 and 1.3) is considered as a bad pixel. Locations of bad pixels defined by the offset value method are shown on FIG. 15B, wherein black points instead of white points are defined as the bad pixels. From FIGS. 15A and 15B, the offset value method is not good for infrared focal plane array with two or more than two response areas. The two-point correction serves to correct the gain value and the offset value of each pixel such that the responsivity value of each pixel can be corrected and arranged on a same line.

The extreme value method first takes images of the flat black body field using infrared focal plane array, captures several original infrared images, takes a mean value of gray level values of a pixel array, and identifies a pixel as a bad pixel when an offset value of the gray level value of the pixel is beyond a percentage range of the mean value of the gray level values of the pixel array (e.g. ±25% or ±30%). For example, when the mean value of the gray level values of the pixel array is 7172, if the percentage range ±25% is taken to identify bad pixels, the pixels with gray level value higher than 8965 and lower than 5379 are considered as bad pixels. However, when the infrared focal plane array has two or more than two different response areas, if the mean value of one of the response areas is taken as a criterion, pixels in the other response area could be determined as bad pixels to cause issue of image distortion for the sake of different ranges or mean value of the gray level values in the other response area.

With reference to FIGS. 16A and 16B, the gain value method is based on a gain table generated by applying two-point correction to the infrared focal plane array and defines a pixel as a bad pixel when a gain value of the pixel is beyond a percentage range of a mean value of the gain table (e.g. ±30%). With reference to FIG. 16A, a histogram defining a relationship between gain value and number of pixel is shown. Any pixel with a gain value beyond ±30% of the mean value (0.7 and 1.3) is considered as a bad pixel. Locations of bad pixels defined by the gain value method are shown on FIG. 16B. From FIGS. 16A and 16B, the gain value method is not good for infrared focal plane array with two or more than two response areas.

As the foregoing methods have drawbacks in terms of accuracy of measuring performance parameters and bad pixel detection, how to increase the accuracy in measuring and analyzing infrared images and in non-uniformity correction and accurately define locations and number of bad pixels becomes a subject to be improved.

SUMMARY OF THE INVENTION

An objective of the present invention is to provide a method for measuring performance parameters of an infrared focal plane array (IRFPA) module capable of increasing accuracy in measuring performance parameters of the IRFPA module and a method for detecting bad pixels capable of reducing error in detecting bad pixels in the IRFPA module.

To achieve the foregoing objective, the method for measuring performance parameters of an infrared focal plane array module is performed by an infrared imaging camera unit and a computer. The infrared imaging camera unit has an infrared focal plane array (IRFPA) module and is connected to the computer. The infrared focal plane array module serves to detect a black body radiation source. The computer serves to perform image division and analysis of performance parameters on images acquired by the infrared imaging camera unit.

The method for measuring performance parameters of an IRFPA module has steps of:

capturing continuous digital images from the IRFPA module;

performing image division on each of the continuous digital images; and measuring multiple performance parameters of each divided digital image, wherein the multiple performance parameters are classified into types of a signal transmission function (SiTF), a temporal noise equivalent temperature difference, a spatial noise equivalent temperature difference, non-uniformity and operability and are calculated by using a responsivity function.

To achieve the foregoing objective, the method for detecting bad pixels of an IRFPA module is performed by an infrared imaging camera unit and a computer. The infrared imaging camera unit has an IRFPA module and is connected to the computer. The infrared focal plane array module serves to detect a black body radiation source. The computer serves to perform image division and analysis of performance parameters on images acquired by the infrared imaging camera unit.

The method for detecting bad pixels of an IRFPA module has steps of:

generating a gain table after two-point correction is applied to the IRFPA module; and defining a pixel in the IRFPA module as a bad pixel if a gain value in the gain table corresponding to the pixels is less than or equal to zero.

Alternatively, the method for measuring performance parameters of an IRFPA module has steps of:

generating an offset table after two-point correction is applied to the IRFPA module; and defining a pixel in the IRFPA module as a bad pixel if an offset value in the offset table corresponding to the pixel is greater than an upper limit of a gray-level dynamic range of the pixel or less than a lower limit of the gray-level dynamic range of the pixel.

Alternatively, the method for measuring performance parameters of an IRFPA module has steps of:

setting a black body temperature of the black body radiation source at a lower temperature, an intermediate temperature and an upper temperature, capturing 100 14-bit digital images from the IRFPA module, acquiring 64 image arrays at each of the lower temperature and the upper temperature, and after taking a temporal average of the 64 image arrays at each of the lower temperature and the upper temperature, acquiring a new image array and taking a spatial average of the new image array to get a mean response value of the IRFPA module at each of the lower temperature and the upper temperature;

altering the black body temperature to the intermediate temperature and continuously capturing 100 images, and calculating a standard deviation of each pixel in the average images array to obtain a new image array representing the temporal noise value of each pixel in the IRFPA module;

calculating a mean value of the temporal noise values of all the pixels of the IRFPA module; and defining a pixel of the IRFPA module as a bad pixel if the temporal noise value is greater than or equal to $\beta$ folds of the mean value.

Alternatively, the method for measuring performance parameters of an IRFPA module has steps of:

setting a black body temperature of the black body radiation source at a lower temperature, an intermediate temperature and an upper temperature, capturing 100 14-bit digital images from the IRFPA module, acquiring 64 image arrays at each of the lower temperature and the upper temperature, and after taking a temporal average of the 64 image arrays at each of the lower temperature and the upper temperature, acquiring a new image array and taking a spatial average of the new image array to get a mean response value of the IRFPA module at each of the lower temperature and the upper temperature;

altering the black body temperature to the intermediate temperature and continuously capturing 100 images, and calculating a standard deviation of each pixel in the average images array to obtain a new image array representing the temporal noise value of each pixel in the IRFPA module;

calculating a mean value of the temporal noise values of all the pixels of the IRFPA module; and defining a pixel of the IRFPA module as a bad pixel if the temporal noise value is greater than or equal to $\beta$ folds of the mean value.

Alternatively, the method for measuring performance parameters of an IRFPA module has steps of:

setting a black body temperature of the black body radiation source at a lower temperature, an intermediate temperature and an upper temperature, capturing 100 14-bit digital images from the IRFPA module, acquiring 64 image arrays at each of the lower temperature and the upper temperature, and after taking a temporal average of the 64 image arrays at each of the lower temperature and the upper temperature, acquiring a new image array and taking a spatial average of the new image array to get a mean response value of the IRFPA module at each of the lower temperature and the upper temperature;

altering the black body temperature to the intermediate temperature and continuously capturing 100 images, taking the temporal average of the 100 images to obtain an average image array at the intermediate temperature, and calculating a standard deviation of the average image array to obtain a spatial noise value of the IRFPA module; and defining a pixel of the IRFPA module as a bad pixel if the standard deviation of the pixel is beyond a range of the mean value $\pm\beta$*the standard deviation.

Given the foregoing methods for measuring performance parameters and detecting bad pixels of an IRFPA module, image division processing can be performed on high-precision digital images. Through the way of defining bad pixels in an IRFPA module, bad pixels in the IRFPA module can be correctly located. Even in the case of two or more than two different response areas, the number and location of bad pixels can still be correctly identified. Accordingly, accuracy in measuring performance parameters of an IRFPA module can be increased and error in detecting bad pixels can be lowered.

Other objectives, advantages and novel features of the invention will become more apparent from the following detailed description when taken in conjunction with the accompanying drawings.

DETAILED DESCRIPTION OF THE INVENTION

Figure 1:
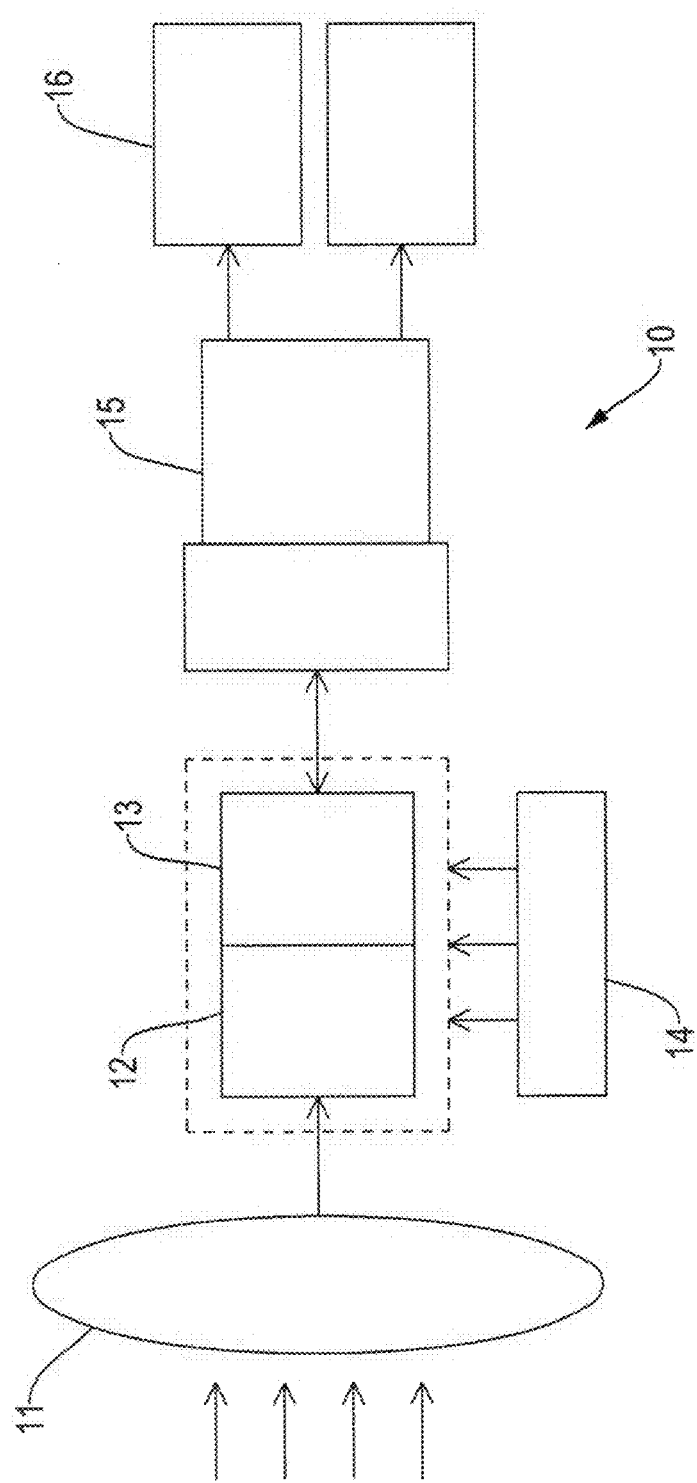
FIG. 1 is functional block diagram of an infrared imaging camera in accordance with the present invention.
Figure 2:
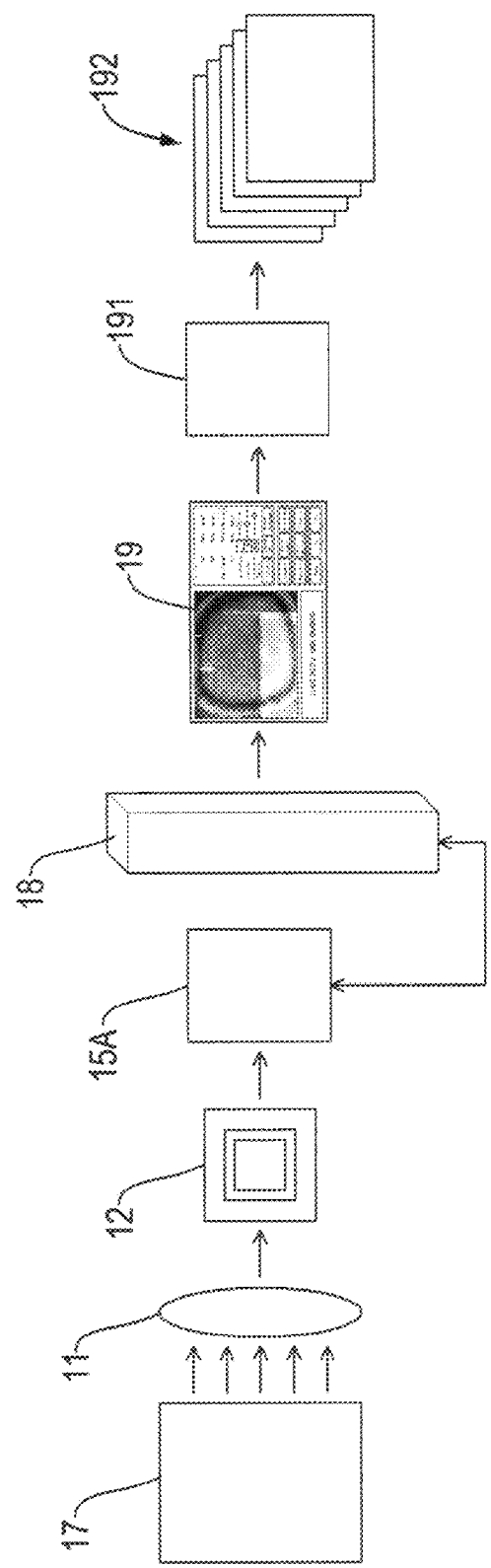
FIG. 2 is a schematic diagram showing processes of using the infrared imaging camera in FIG. 1 to acquire images.
Figure 3:
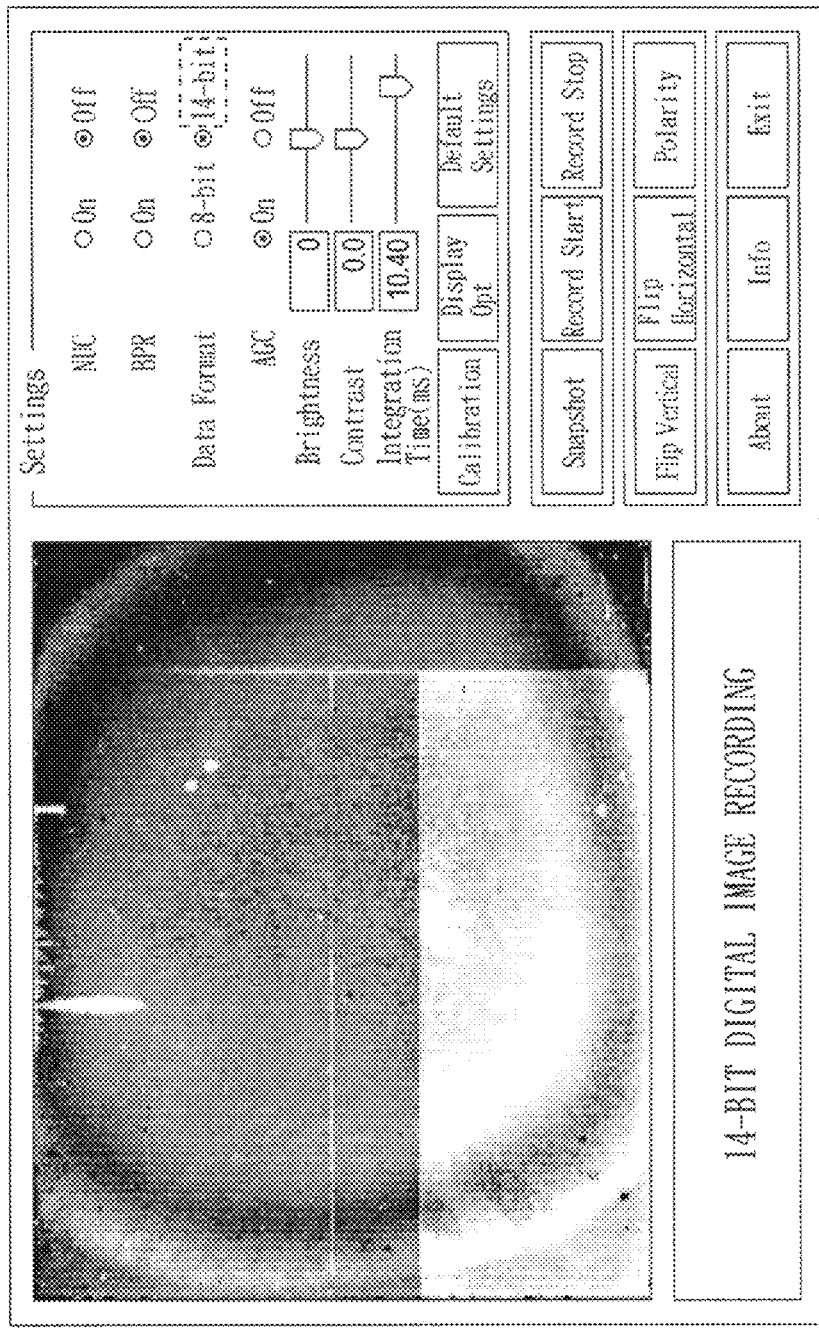
FIG. 3 is a schematic diagram showing an operation interface of the infrared imaging camera in FIG. 1.

With reference to FIGS. 1 to 3, an infrared imaging camera 10 adopts a quantum well infrared (IR) imaging camera unit, which includes an IR lens 11, an infrared focal plane array (IRFPA) module 12, a readout integrated circuit (ROIC) 13, a cooler 14, and a video processing board 15. The video processing board 15 is electrically connected to a display 16. The display 16 serves to display infrared images. The cooler 14 serves to cool down temperature of the IRFPA module 12 for the IRFPA module 12 to correctly receive infrared light signals. In the present embodiment, the IRFPA module 12 has an array of pixels, which are 320×256 pixels, and the detection wavelength is in a range of 7.7-9.4 μm. With reference to FIG. 2, the IRFPA module 12 has an IR lens 11 facing a black body radiation source 17 (an object). The IRFPA module 12 is electrically connected to an infrared video processing board 15A. The infrared video processing board 15A has the ROIC 13 and the video processing board 15 in FIG. 1, and is electrically connected to a computer 18. An imaging process of the infrared imaging camera 10 is described as follows. The black body radiation source 17 radiates out IR signals. The IR signals are propagated through air to the IR lens 11 and are further focused on the IRFPA module 12. The infrared video processing board 15A acquires a voltage value or a current value of each pixel on the IRFPA module 12. The infrared video processing board 15A utilizes a software recording means to acquire 14-bit continuous images from the IRFPA module 12. An image processing interface 19 in the computer 18 performs image division on each of continuous high-resolution digital images 192 to acquire multiple high-resolution divided digital images 192. The imaging process of the infrared imaging camera 10 ensures acquisition of dynamic images with high gray level values and increases accuracy in terms of performance parameters of the IRFPA module 12 at lower equipment cost without requiring any external image acquisition card.

Methods for detecting bad pixels of the IRFPA module 12 include a gain value method, an offset value method, a temporal noise method and a spatial noise method.

Figure 4A:
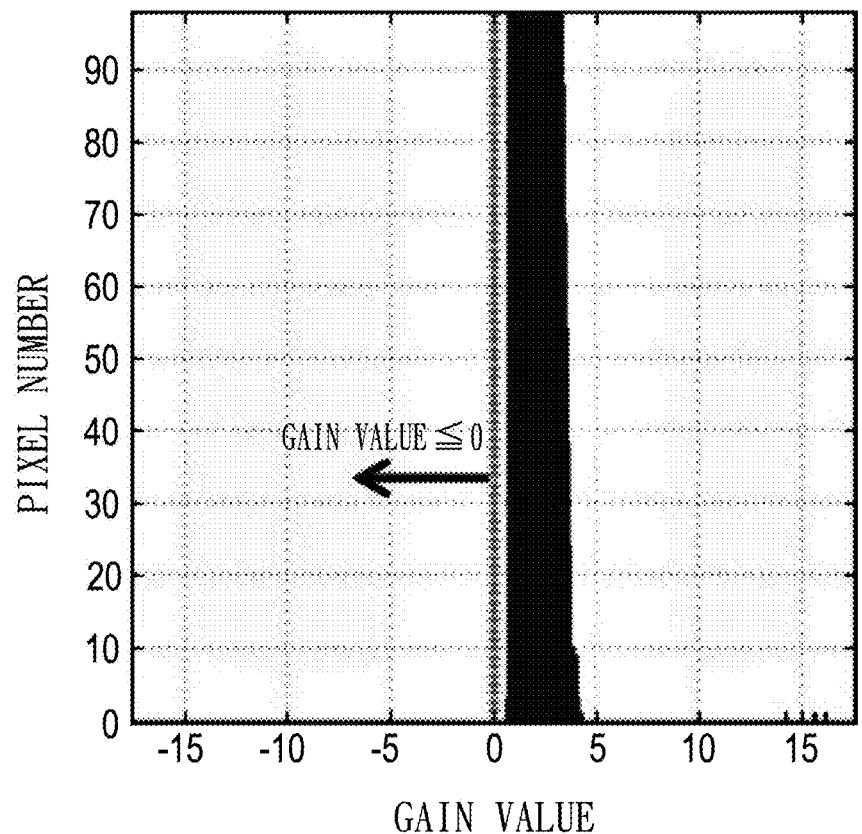
FIG. 4A is a histogram showing bad pixels in an original image in FIG. 13 defined by a gain value method in accordance with the present invention.
Figure 4B:
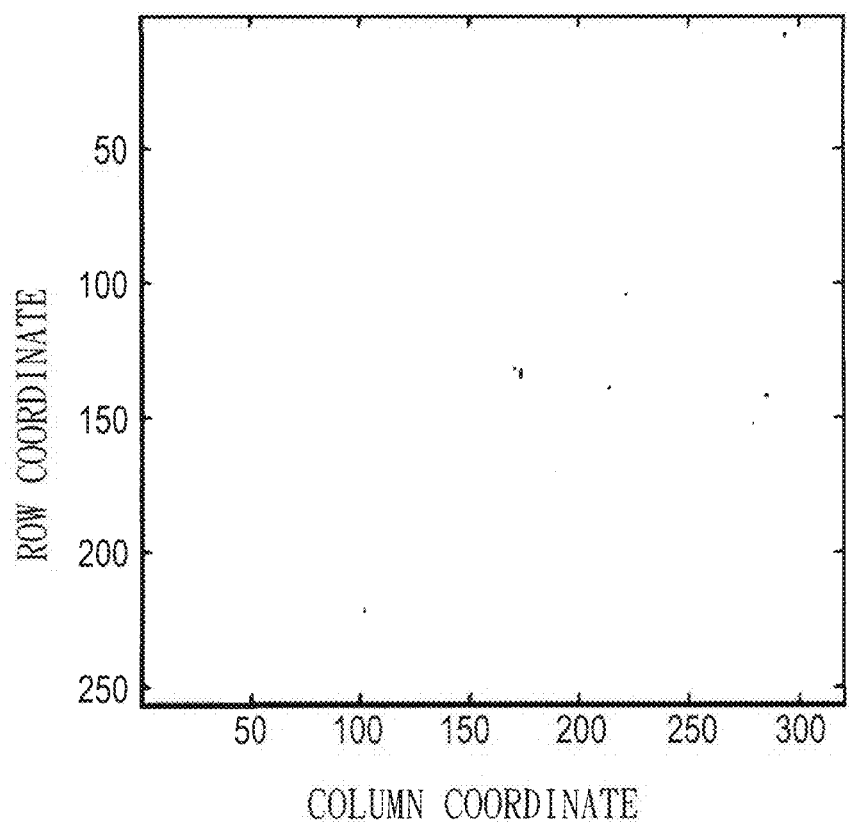
FIG. 4B is a coordinate graph showing locations of bad pixels in the original image in FIG. 13 defined by the gain value method in FIG. 4A.

With reference to FIGS. 4A and 4B, the gain value method is characterized in that a gain table is generated by the IRFPA module 12 after two-point correction is applied, and if a gain value in the gain table corresponding to a pixel in the IRFPA module 12 is less than or equal to zero, the pixel is defined as a bad pixel. Furthermore, a mean value of the gain table is obtained, a specific percentage range (±β%, where β is an adjustment coefficient) of the mean value is taken as a criterion, and a pixel with a gain value beyond the specific percentage range of the mean value is defined as a bad pixel.

Figure 5A:
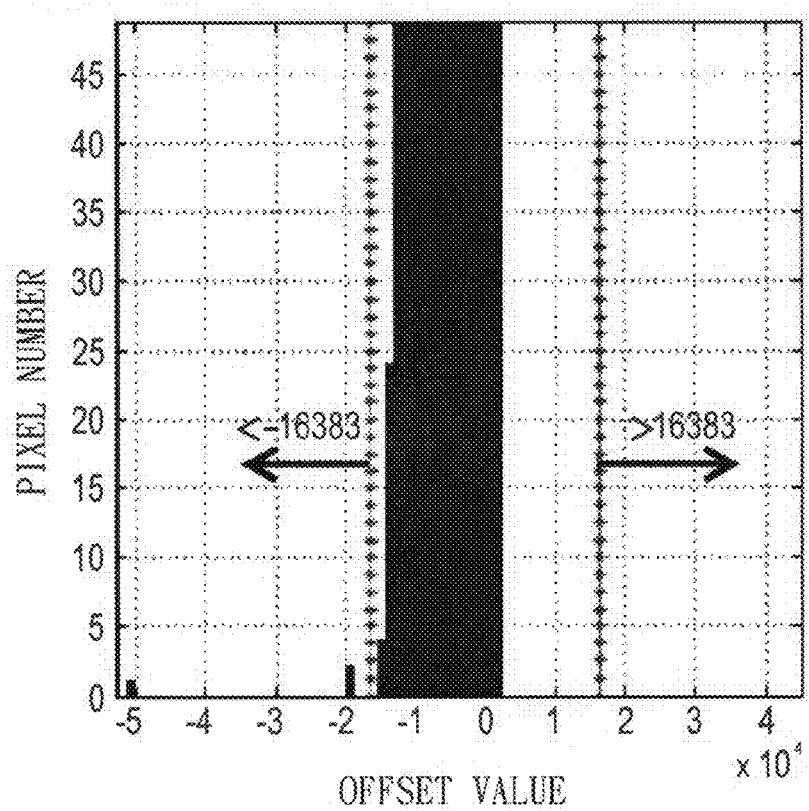
FIG. 5A is a histogram showing bad pixels in an original image in FIG. 13 defined by an offset value method in accordance with the present invention.
Figure 5B:
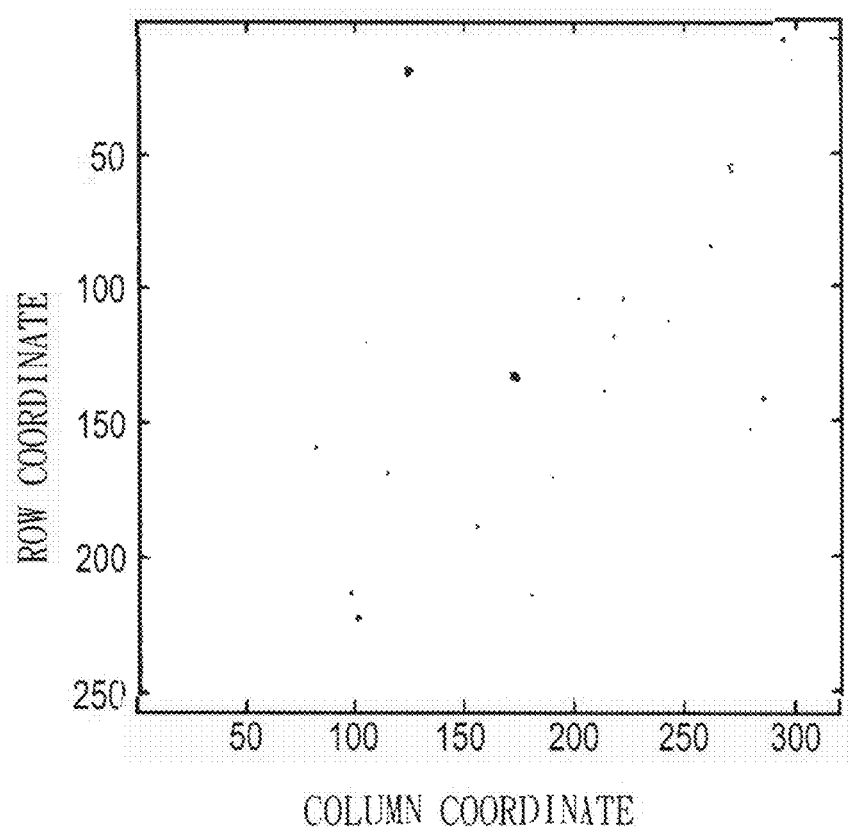
FIG. 5B is a coordinate graph showing locations of bad pixels in the original image in FIG. 13 defined by the offset value method in FIG. 5A.

With reference to FIGS. 5A and 5B, the offset value method is characterized in that an offset table is generated by the IRFPA module 12 after two-point correction is applied, and if an offset value in the offset table corresponding to a pixel in the IRFPA module 12 is greater than 16383 (an upper limit of a gray-level dynamic range of an infrared detector corresponding to the pixel in the IRFPA module 12 for determining the entity of a pixel) or the offset value of the pixel is less than −16383 (a lower limit of a gray-level dynamic range of an infrared detector corresponding to the pixel in the IRFPA module 12 for determining the entity of a pixel), the pixel is defined as a bad pixel. Furthermore, a mean value of the offset table is obtained, a specific percentage range (±β%) of the mean value is taken as a criterion, and a pixel with an offset value beyond the specific percentage range of the mean value is defined as a bad pixel. Being an adjustment coefficient, β may be 20, 25 or 30.

Figure 6A:
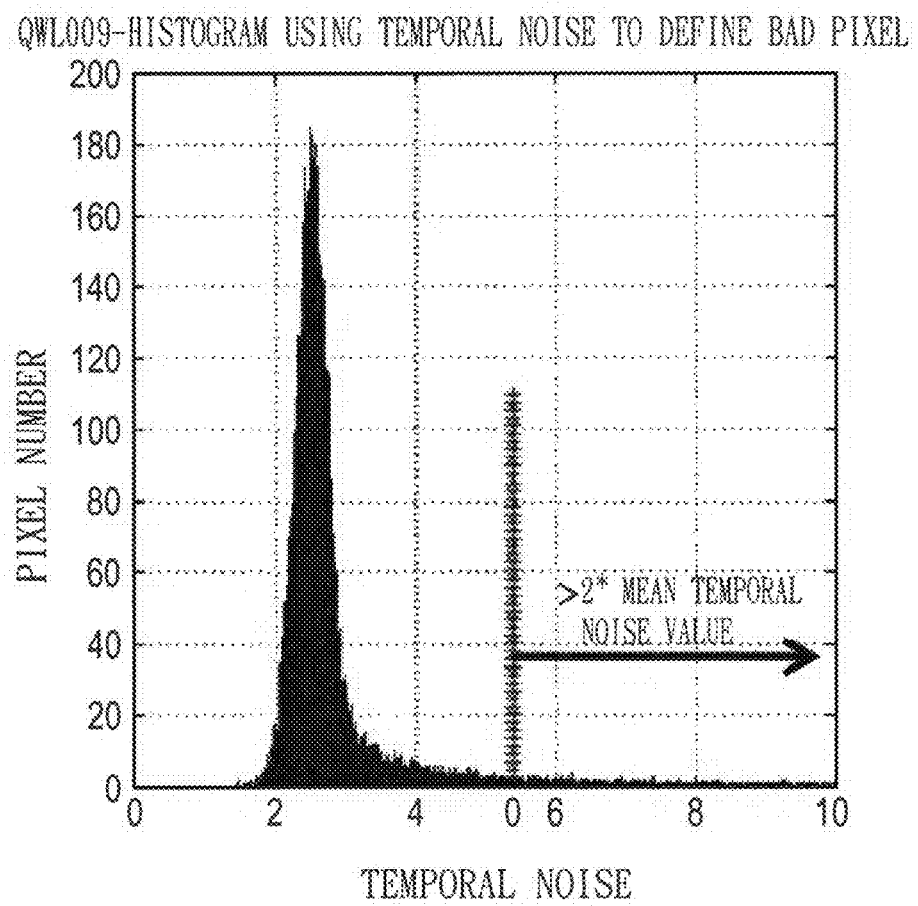
FIG. 6A is a histogram showing bad pixels in an original image in FIG. 13 defined by a temporal noise method in accordance with the present invention.
Figure 6B:
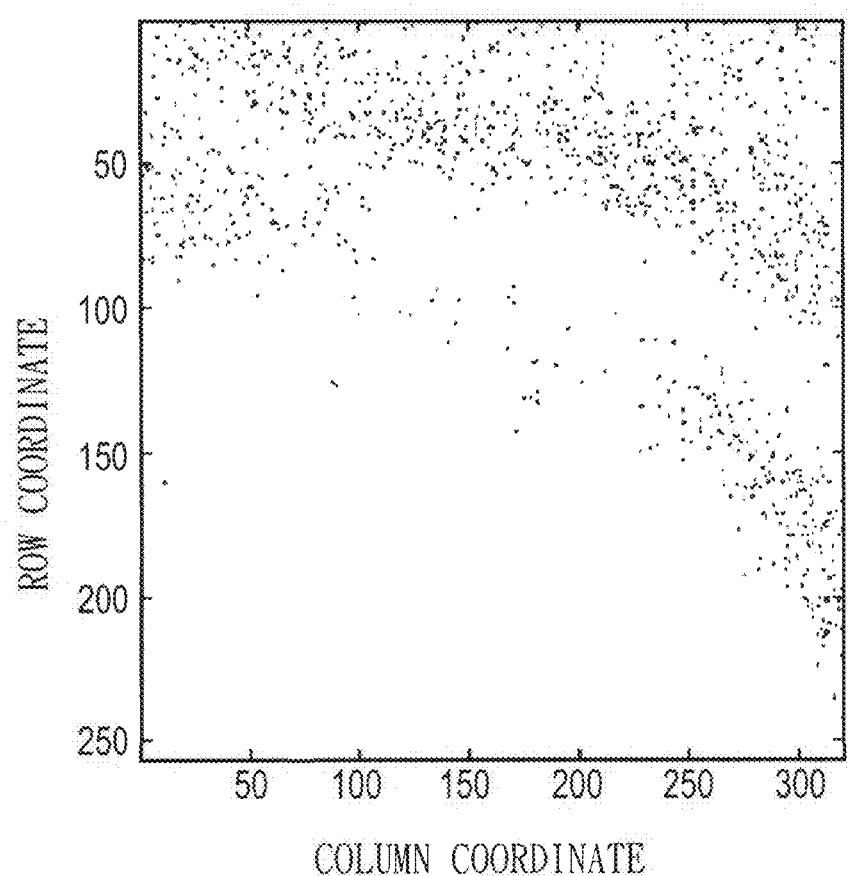
FIG. 6B is a coordinate graph showing locations of bad pixels in the original image in FIG. 13 defined by the temporal noise method in FIG. 6A.

With reference to FIGS. 6A and 6B, the temporal noise method measures a temporal noise value of each pixel in the IRFPA module 12, calculates a mean value of the temporal noise values of all the pixels, and a pixel with the temporal noise value greater than or equal to β folds of the mean value is defined as a bad pixel. Being an adjustment coefficient, β may be 1.5, 2 or 2.5.

Figure 7A:
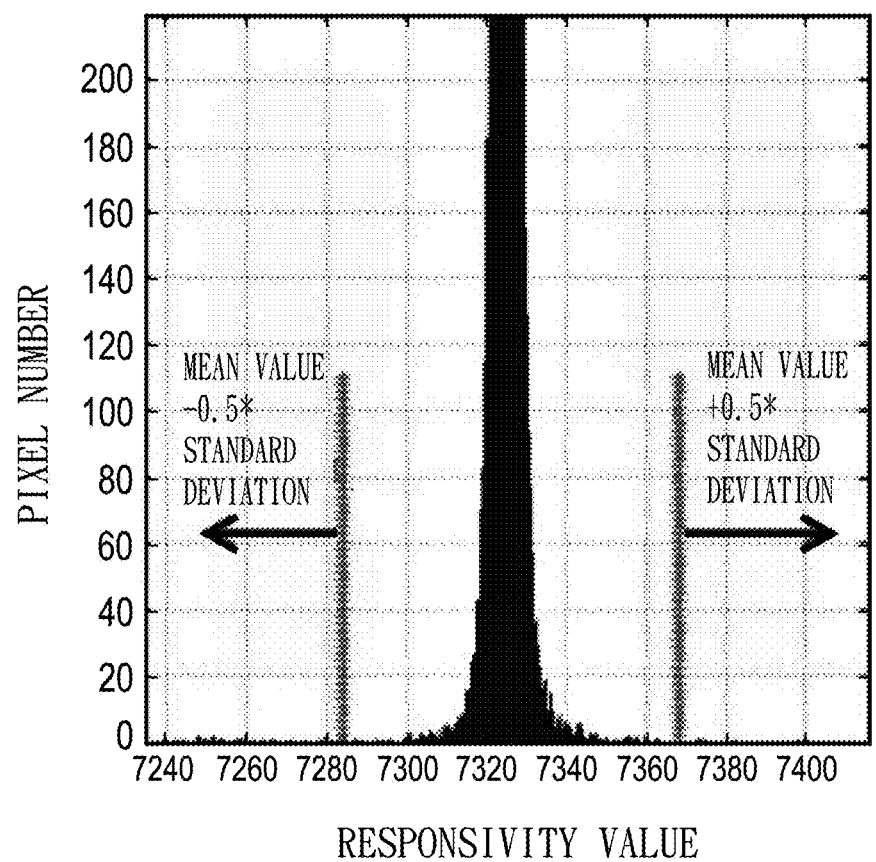
FIG. 7A is a histogram showing bad pixels in an original image in FIG. 13 defined by a spatial noise method in accordance with the present invention.
Figure 7B:
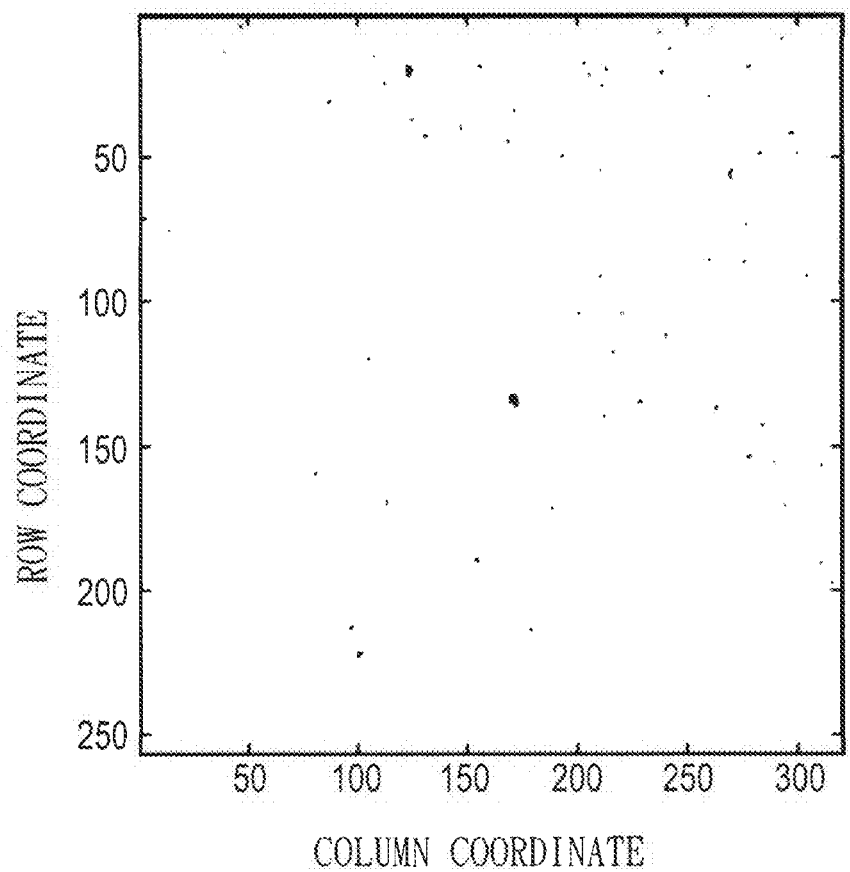
FIG. 7B is a coordinate graph showing locations of bad pixels in the original image in FIG. 13 defined by the spatial noise method in FIG. 7A.

With reference to FIGS. 7A and 7B, the spatial noise method uses the IRFPA module 12 to acquire mages with an intermediate temperature between an upper temperature image and a lower temperature after two-point correction is applied, calculates a mean value and a standard deviation (spatial noise value) of total pixels of the images, and defines a pixel as a bad pixel when the responsivity value of the pixel is beyond a range of the mean value ±β*the standard deviation, where β is an adjustment coefficient and may be 0.5, 1 or 1.5.

Given the foregoing four bad pixel detection methods, bad pixels of the IRFPA module 12 can be correctly identified or compensated. Despite two or more than two different response areas in the IRFPA module 12, bad pixels can still be correctly defined. Accuracy in measuring performance parameters of the IRFPA module 12 can be enhanced accordingly and detection error out of bad pixels can be reduced.

As to the method for measuring performance parameters of the IRFPA module 12, a responsivity function of the IRFPA module 12 is obtained first. The responsivity function corresponds to various responsivity values that are generated by the infrared imaging camera 10 and vary according to temperature variations of a large object, and can provide performance parameters, such as gain value, linearity, dynamic range, saturation level and noise level. The responsivity function can be normally expressed by an S-shaped curve. A linear portion of the curve of the responsivity function pertains to a signal transmission function. Regular infrared imaging camera 10 has various ways of defining dynamic range. One way of defining dynamic range is to generate a ratio of a temperature variation ($\Delta T_S$) at 95% of the saturation level to a temperature resolution of the infrared imaging camera 10. Generally, the temperature resolution is assumed to be equal to the noise equivalent temperature difference (NEDT) of the infrared imaging camera 10.

The method for measuring performance parameters of the IRFPA module 12 has steps of acquiring continuous high-resolution digital images of the IRFPA module 12, performing image division on each of the continuous digital images, and analyzing multiple performance parameters of each divided image. The performance parameters include (A) signal transmission function, (B) temporal noise equivalent temperature difference, (C) spatial noise equivalent temperature difference, (D) Non-uniformity, and (D) operability. As NEDT is a critical parameter for assessing performance of the infrared imaging camera 10, NEDT can be interpreted as the sensitivity or analysis capability of the infrared imaging camera 10 to temperature. Methods of measuring the foregoing performance parameters are described as follows.

(A) A method for measuring the signal transmission function has the following steps.

Step A1: Perform two-point correction on the IRFPA module 12 and make compensation for the bad pixels.

Step A2: Place a black body radiation source in front of the IR lens 11 with a distance between the black body radiation source 17 and the IR lens 11 less than 5 cm, configure a black body temperature of the black body radiation source 17, and continuously capture a 14-bit high precision digital image from the IRFPA module 12 at a 5° C. interval.

Figure 8:
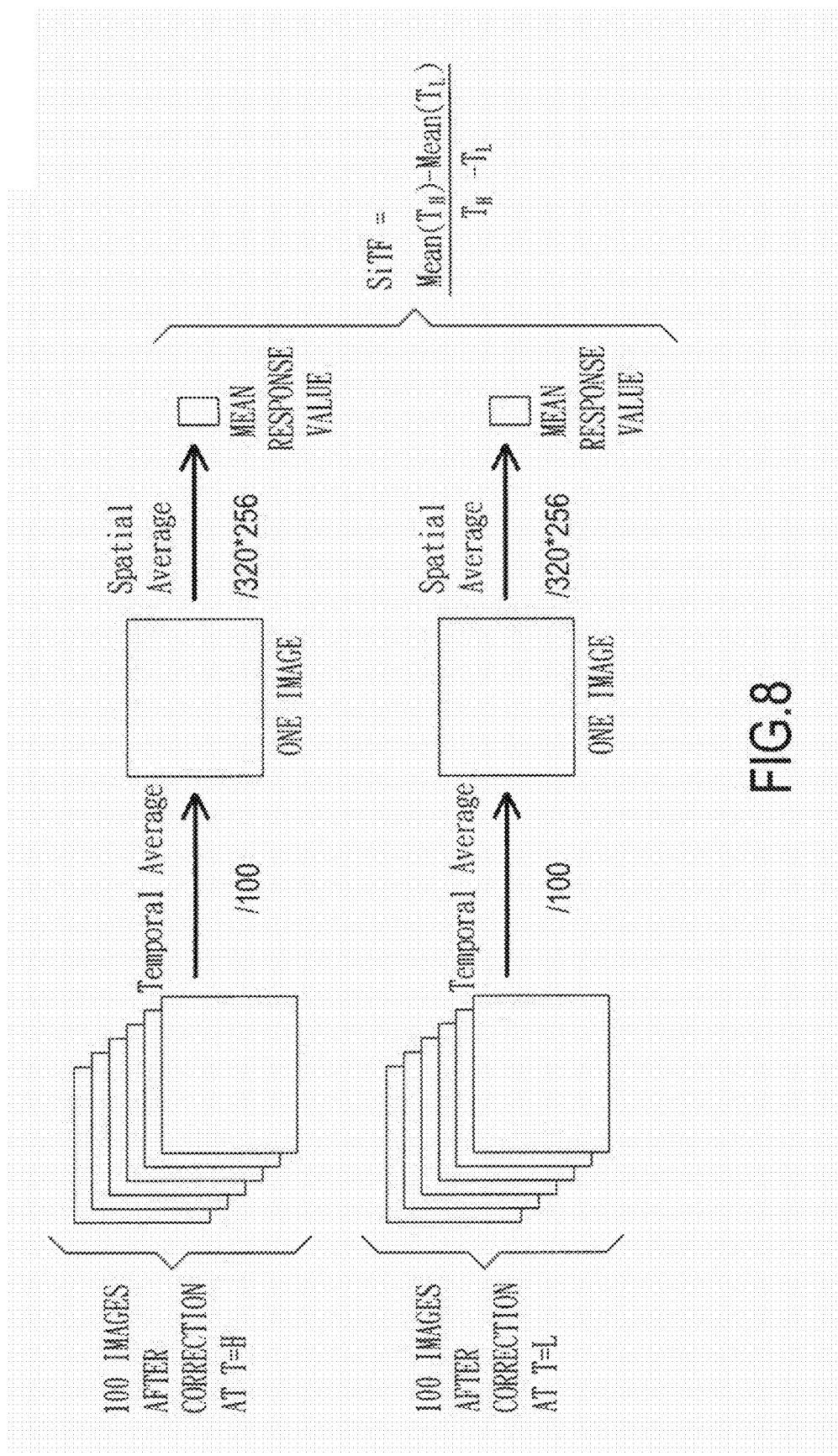
FIG. 8 is a flow chart showing processes of calculating a signal transmission function in accordance with the present invention.

Step A3: Perform image division on the continuously captured images, acquire 100 image arrays and take a temporal average of the 100 image arrays to generate a single image array, take a spatial average of the single image array or add the gray-level value of each pixel of the single image array to a total, which is divided by a total pixel count of the single image array to obtain a mean response value at the configured black body temperature, as shown in FIG. 8.

Step A4: After the mean response values at all selected black body temperatures are acquired, plot a curve of a responsivity function. A signal transfer function (SiTF) value is obtained from a linear portion of the responsivity function, that is, a ratio of a difference of two mean response values on a line to a temperature difference. The SiTF value is expressed by the following equation.

$$SiTF = \frac{\text{Mean}(T_H) - \text{Mean}(T_L)}{T_H - T_L}$$

where $T_H$ is a high temperature, $T_L$ is a low temperature, Mean($T_H$) is a mean value of the gray-level values of all the pixels of the single image array at the high temperature, and Mean($T_L$) is a mean value of the gray-level values of all the pixels of the single array at the low temperature.

(B) A method for measuring temporal noise equivalent temperature difference has the following steps.

Step B1: Perform two-point correction on the IRFPA module 12 and make compensation for the bad pixels.

Figure 9:
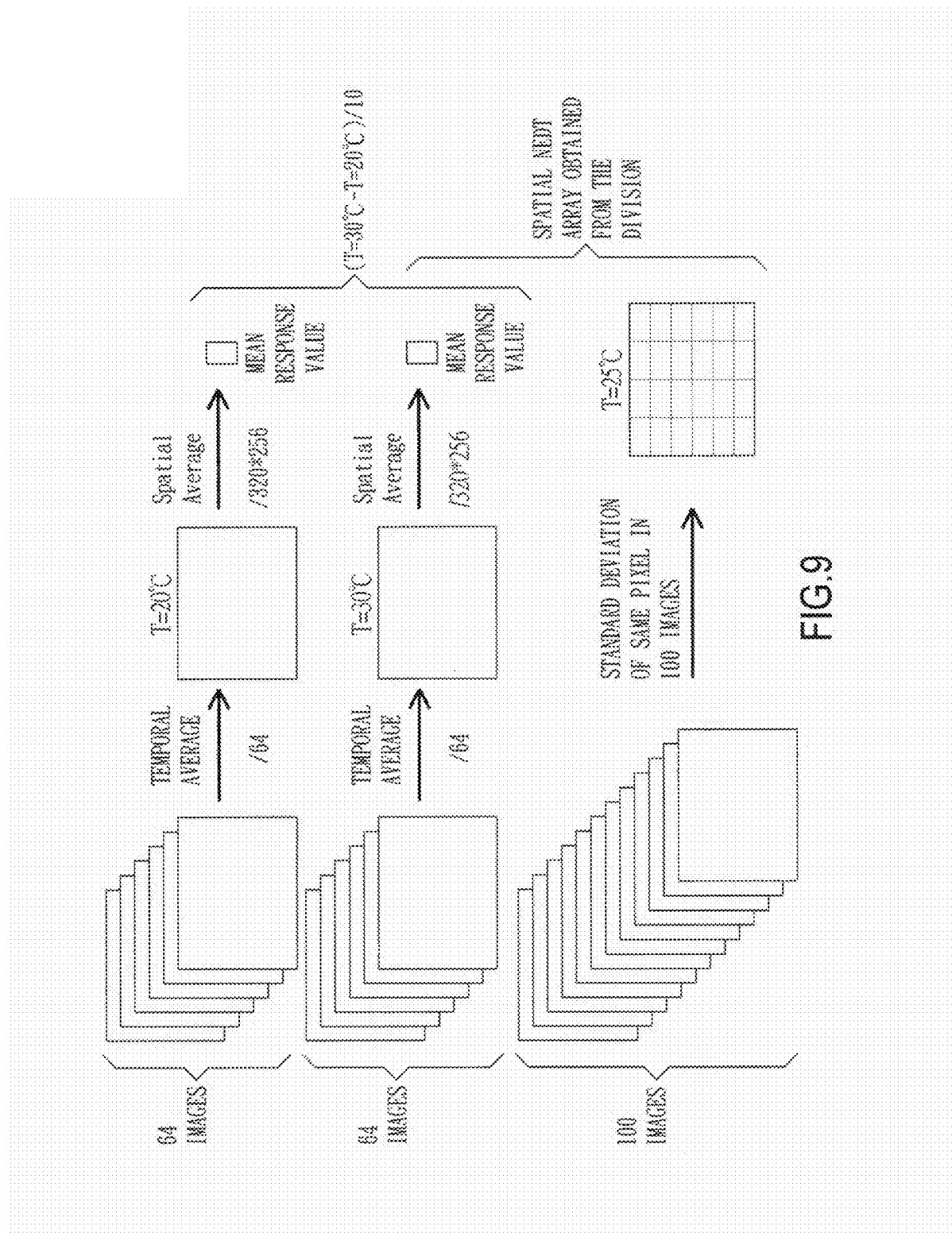
FIG. 9 is a flow chart showing processes of calculating equivalent temperature difference of temporal noise in accordance with the present invention.

Step B2: Place a black body radiation source in front of the IR lens 11 with a distance between the black body radiation source 17 and the IR lens 11 less than 5 cm, set a black body temperature of the black body radiation source 17 at 20° C., 25° C. and 30° C., capture 100 14-bit high-precision digital images from the IRFPA module 12 at each of 20° C., 25° C. and 30° C., acquire 64 image arrays at each of 20° C. and 30° C., and after taking the temporal average of the 64 image arrays at each of 20° C. and 30° C., acquire a new image array and take the spatial average of the new image array to get a mean response value of the IRFPA module 12 at each of 20° C. and 30° C. as shown in FIG. 9.

Step B3: Alter the black body temperature to 25° C. and continuously capture 100 images, and calculate a standard deviation of each pixel in the average images array to obtain a new image array representing a temporal noise value of each pixel in the IRFPA module 12.

Step B4: Divide a difference between the mean responsivity values at 30° C. and 20° C. by 10 in generation of the SiTF value.

Step B5: Divide the temporal noise value of each pixel in the IRFPA module 12 by the SiTF value to generate a temporal noise equivalent temperature difference value being an element of a temporal noise equivalent temperature difference array.

Step B6: Take the average of the elements of the temporal noise equivalent temperature difference array to obtain a mean temporal noise equivalent temperature difference value.

(C) A method for measuring spatial noise equivalent temperature difference has the following steps.

Step C1: Perform two-point correction on the IRFPA module 12 and make compensation for the bad pixels.

Figure 10:
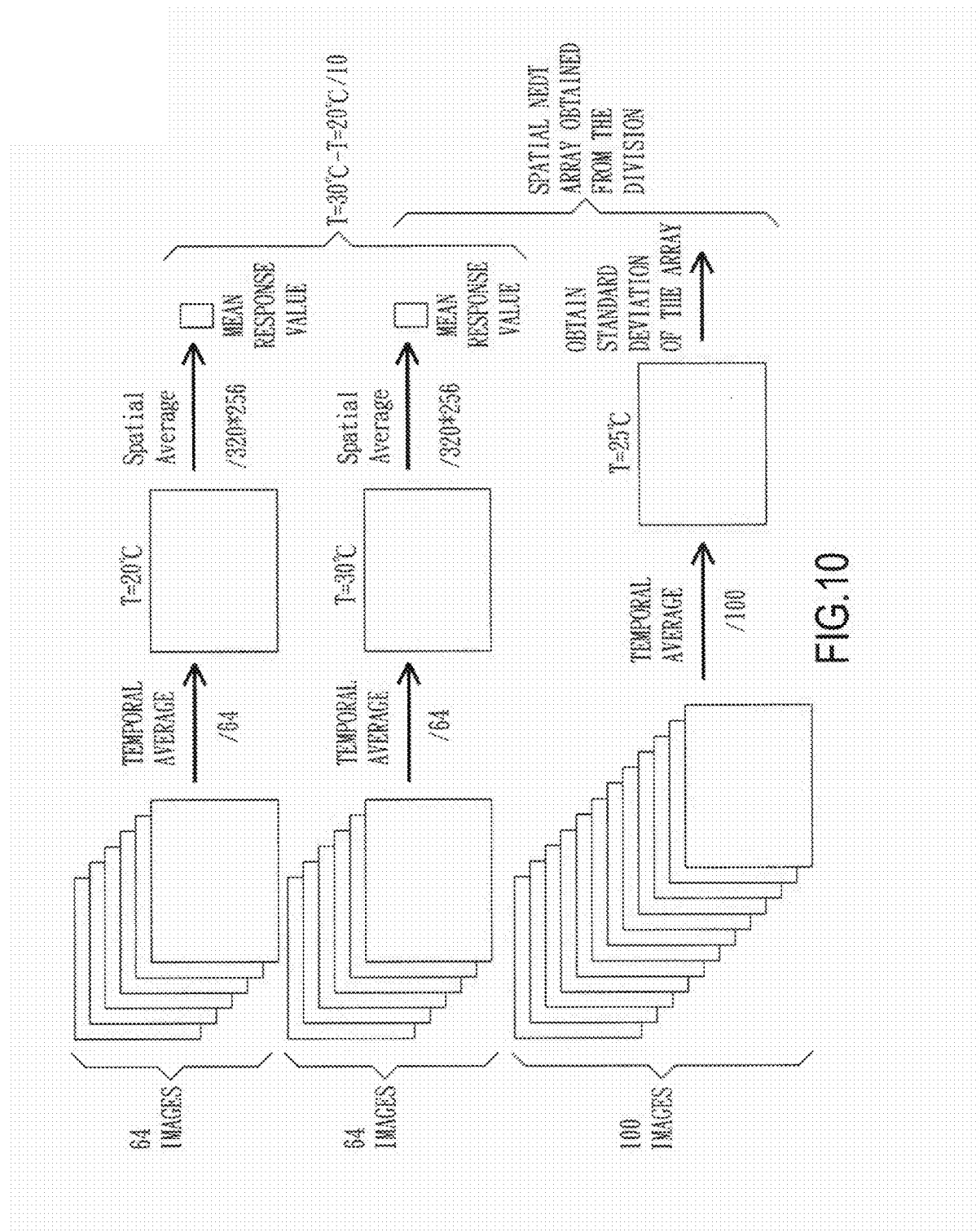
FIG. 10 is a flow chart showing processes of calculating equivalent temperature difference of spatial noise in accordance with the present invention.

Step C2: Place a black body radiation source in front of the IR lens 11 with a distance between the black body radiation source 17 and the IR lens 11 less than 5 cm, set a black body temperature of the black body radiation source 17 at 20° C., 25° C. and 30° C., capture 100 14-bit high-precision digital images from the IRFPA module 12, acquire 64 image arrays at each of 20° C. and 30° C., and after taking the temporal average of the 64 image arrays at each of 20° C. and 30° C., acquire a new image array and take the spatial average of the new image array to get a mean response value of the IRFPA module 12 at each of 20° C. and 30° C. as shown in FIG. 10.

Step C3: Alter the black body temperature to 25° C. and continuously capture 100 images, take the temporal average of the 100 images to obtain an average image array at 25° C., calculate a standard deviation of the average image array to obtain a spatial noise value of the IRFPA module 12.

Step C4: Divide a difference between the mean responsivity values at 30° C. and 20° C. by 10 in generation of the SiTF value.

Step C5: Divide the spatial noise value of the IRFPA module 12 by the SiTF value to generate a spatial noise equivalent temperature difference value.

(D) A method for measuring non-uniformity has the following steps.

Step D1: Perform two-point correction on the IRFPA module 12 and make compensation for the bad pixels.

Figure 11:
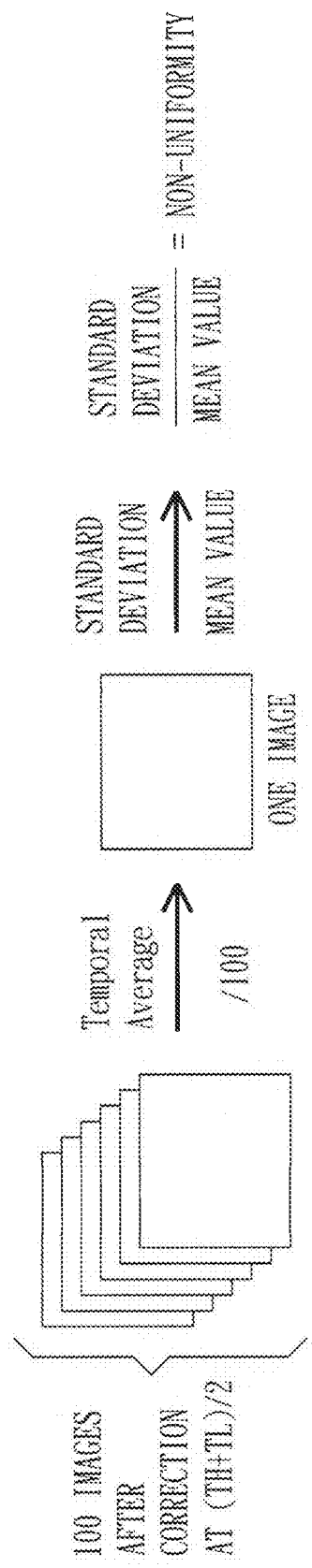
FIG. 11 is a flow chart showing processes of calculating non-uniformity in accordance with the present invention.
Figure 12:
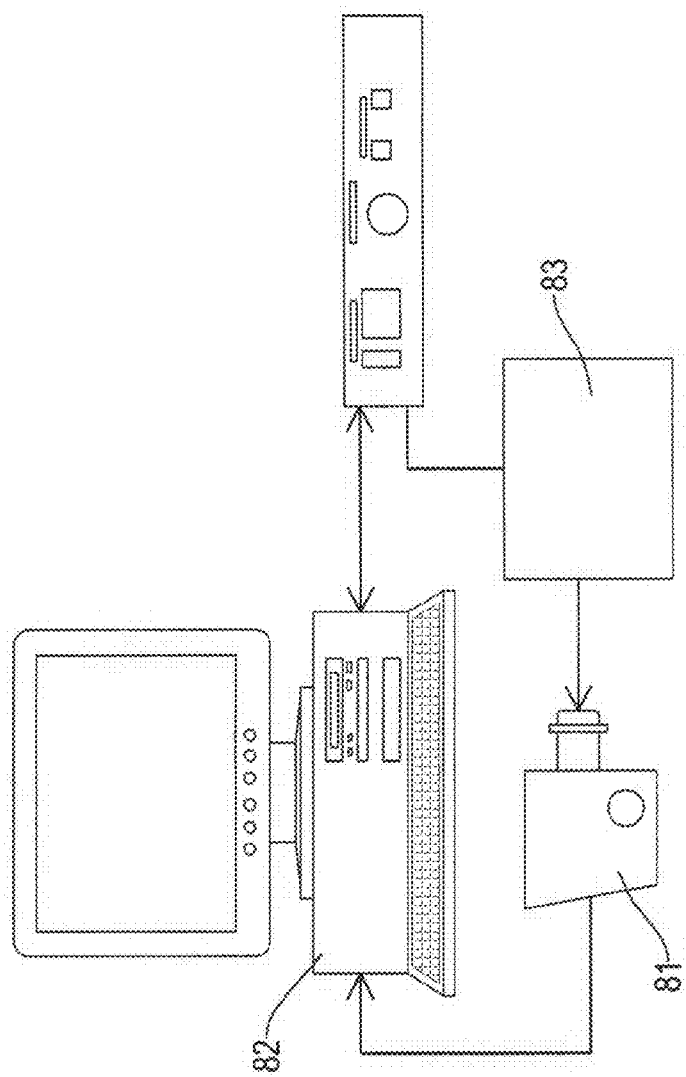
FIG. 12 is a schematic diagram of a conventional infrared imaging camera.
Figure 13:
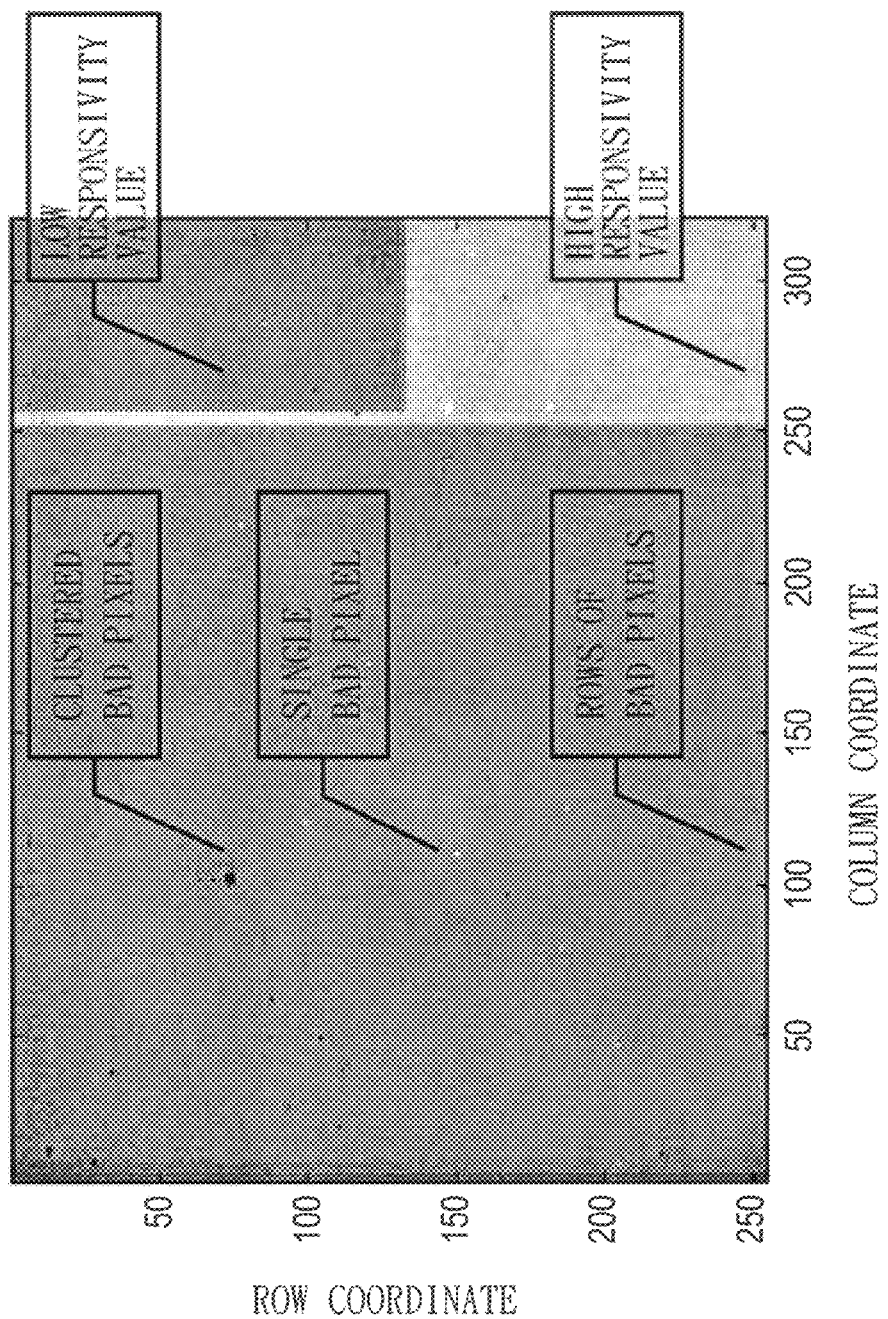
FIG. 13 is a chart graph of an original image taken by a conventional infrared focal plane array.
Figure 14:
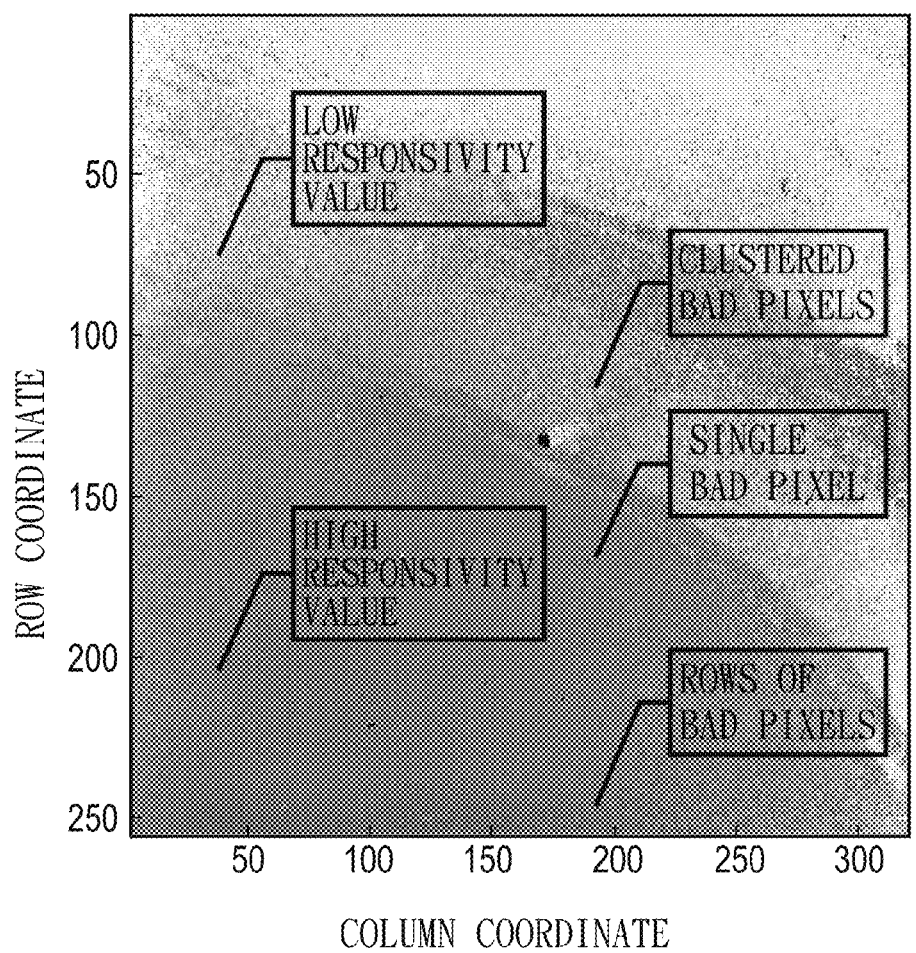
FIG. 14 is a chart graph of another original image taken by a conventional infrared focal plane array.
Figure 15A:
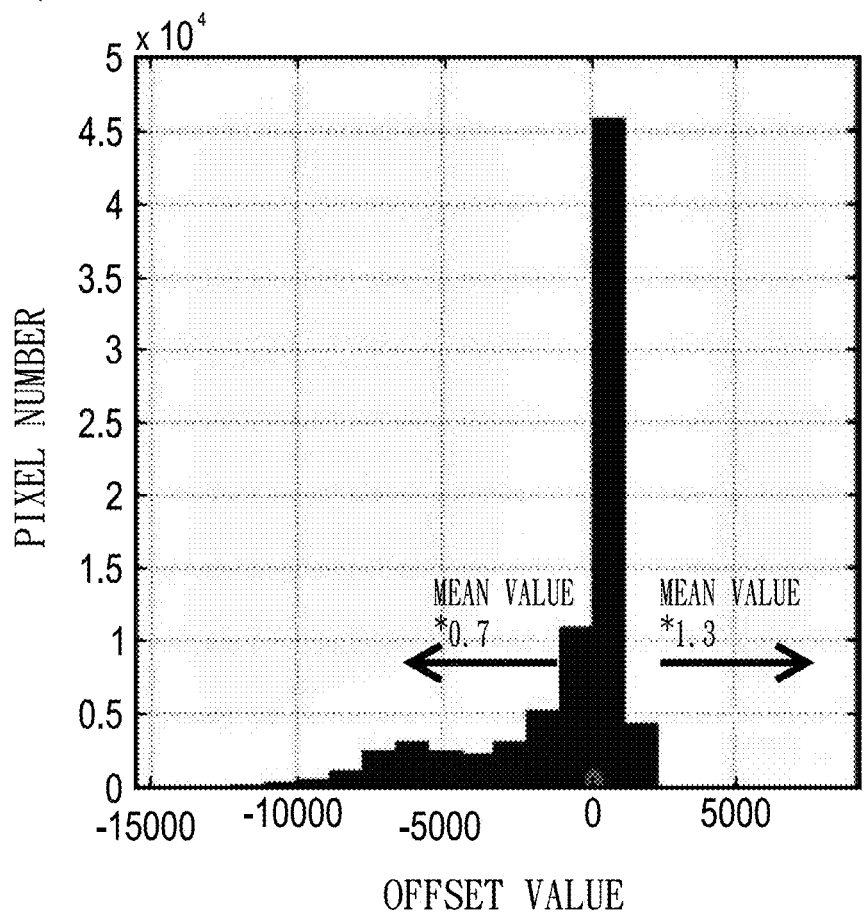
FIG. 15A is a histogram showing bad pixels defined by a conventional offset value method.
Figure 15B:
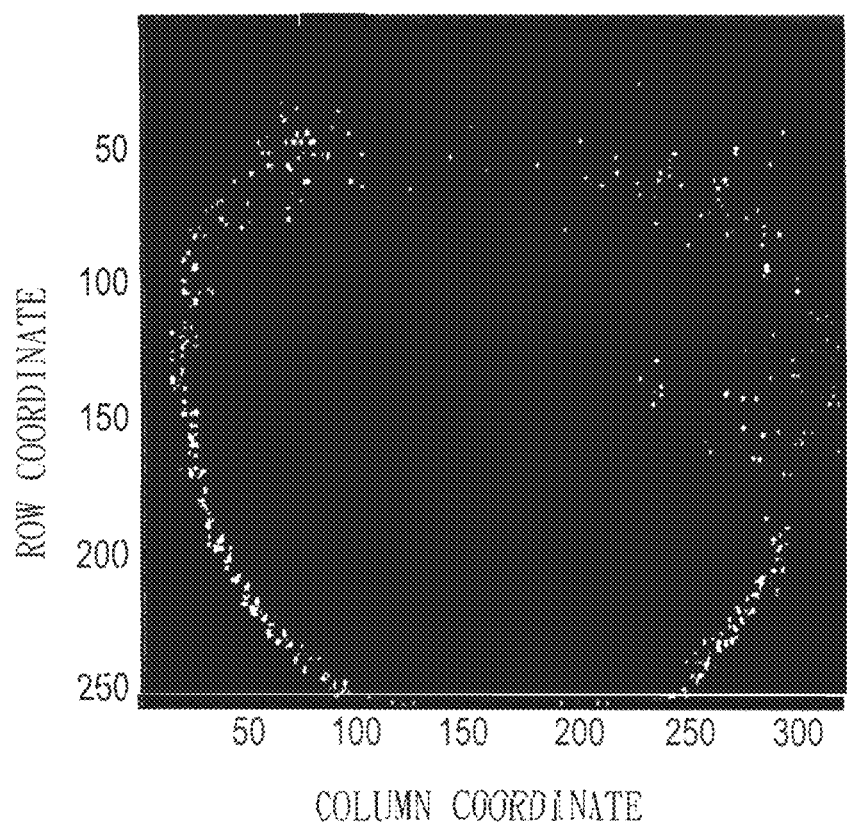
FIG. 15B is a coordinate graph showing locations of bad pixels defined by the conventional offset value method in FIG. 15A.
Figure 16A:
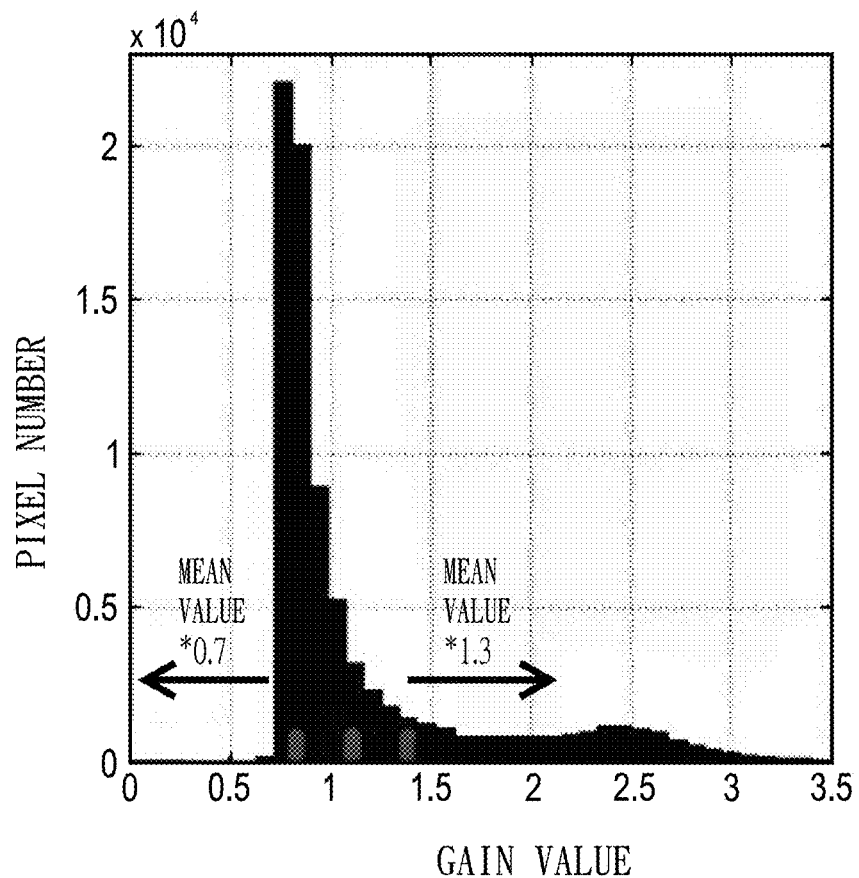
FIG. 16A is a histogram showing bad pixels defined by a conventional gain value method.
Figure 16B:
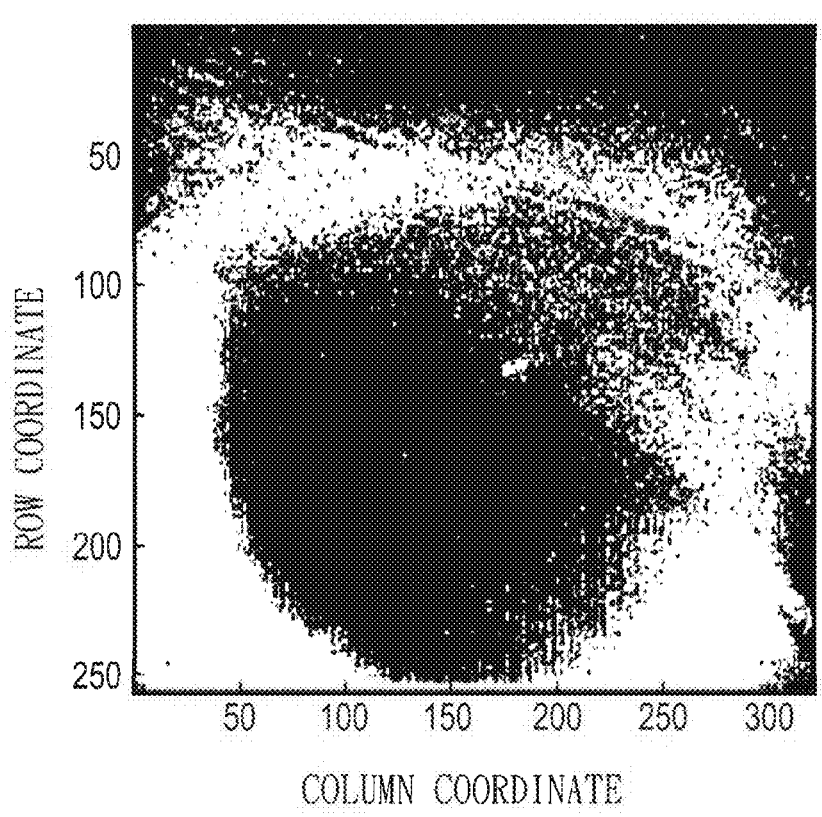
FIG. 16B is a coordinate graph showing locations of bad pixels defined by the conventional gain value method in FIG. 16A.

Step D2: Place a black body radiation source in front of the IR lens 11 with a distance between the black body radiation source 17 and the IR lens 11 less than 5 cm, set a black body temperature of the black body radiation source 17 at an intermediate temperature between a lower temperature and a higher temperature upon the two-point correction, and capture 100 14-bit high-precision digital images from the IRFPA module 12 as shown in FIG. 11.

Step D3: Take the temporal average of the 100 digital images to obtain a new image array and calculate a mean value and a standard deviation of the new image array. The non-uniformity value of the IRFPA module 12 is calculated by dividing the standard deviation by the mean value.

(E) A method for measuring operability has the following steps.

Step E1: Define the number of bad pixels according to the foregoing four bad pixel detection methods.

Step E2: Obtain the operability value of the IRFPA module 12 as a ratio of a value obtained by subtracting the number of the bad pixels from the number of the total pixels in the IRFPA module 12 to the number of the total pixels in the IRFPA module 12.

The method for detecting bad pixels of the IRFPA module 12 can be also described as follows.

(F) The gain value method and the offset value method have the following steps.

Step F1: Place a black body radiation source in front of the IR lens 11 with a distance between the black body radiation source 17 and the IR lens 11 less than 5 cm, set a black body temperature of the black body radiation source 17 at 20° C., 25° C. and 30° C., capture 100 14-bit high-precision digital images undergoing no correction from the IRFPA module 12 at each of 20° C., 25° C. and 30° C.

Step F2: Take the temporal average of the 100 digital images at each of 20° C. and 30° C. to obtain an average image array and a mean value of the average image array. The responsivity value of each pixel in the average image array at 20° C. is configured as X1. The responsivity value of each pixel in the average image array at 30° C. is configured as X2. The mean value of the average image array at 20° C. is configured as Y1. The mean value of the average image array at 30° C. is configured as Y2. The values of X1, X2, Y1 and Y2 are substituted into a linear equation in two variables Y=AX+B to solve the A (Gain Table) and the B (Offset Table).

Step F3: Define a pixel as a bad pixel when the gain value of the pixel is less than or equal to zero.

Step F4: Define a pixel as a bad pixel when the offset value of the pixel is greater than a maximum gray-level dynamic range of an infrared detector or is less than a negative value of the maximum gray-level dynamic range of the infrared detector.

(G) The temporal noise method has the following steps.

Step G1: capture 100 14-bit high-precision digital images undergoing no correction from the IRFPA module 12 at 25° C. and calculate the standard deviation of each pixel of the 100 digital images to obtain a temporal noise array representing temporal noise values of the IRFPA module 12.

Step G2: Take the average of the elements of the temporal noise array to obtain a mean value.

Step G3: Define a pixel as a bad pixel when the temporal noise of the pixel is greater than twice the mean value.

(H) The spatial noise method has the following steps.

Step H1: Capture 100 14-bit high-precision digital images undergoing no correction from the IRFPA module 12 at 25° C. and take the temporal average of the 100 digital images at 25° C. to obtain an average image array.

Step H2: Multiply the average image array at 25° C. with the gain table and then add the offset table to obtain an image array undergoing the correction.

Step H3: Take the average of the elements of the corrected image array to obtain a mean value and a standard deviation (spatial noise value), and define a pixel as a bad pixel when the spatial noise value of the pixel is beyond a range of −0.5*standard deviation and 0.5*standard deviation.

In sum, the foregoing methods for detecting bad pixel can correctly identify bad pixels of the IRFPA module, increase the accuracy in measuring the performance parameters of the IRFPA module, and reduce error in bad pixel detection.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A method for measuring performance parameters of an infrared focal plane array module performed by an infrared imaging camera unit and a computer, wherein the infrared imaging camera unit has an infrared focal plane array (IRFPA) module and is connected to the computer, the IRFPA module serves to detect a black body radiation source, and the computer serves to perform image division and analysis of performance parameters on images acquired by the infrared imaging camera unit, the method comprising steps of:

capturing continuous digital images from the IRFPA module;

performing image division on each of the continuous digital images to generate multiple divided digital images with each divided digital image corresponding to a response area of the continuous digital image; and measuring multiple performance parameters of each divided digital image, wherein the multiple performance parameters are classified into types of a signal transmission function (SiTF), a temporal noise equivalent temperature difference, a spatial noise equivalent temperature difference, non-uniformity and operability and are calculated by using a responsivity function.

2. The method as claimed in claim 1, wherein when measuring the SiTF using the responsivity function, the method comprises steps of:

configuring a black body temperature of the black body radiation source and continuously capturing a 14-bit digital image from the IRFPA module at a 5° C. interval;

performing image division on the continuously captured images, acquiring 100 image arrays and taking a temporal average of the 100 image arrays to generate a single image array, taking a spatial average of the single image array or adding a gray-level value of each pixel in the single image array to a total, which is divided by a total pixel count of the single image array to obtain a mean responsivity value at the configured black body temperature; and plotting a curve of the responsivity function, wherein a value of the SiTF is obtained by a ratio of a difference of two mean response values on a line to a temperature difference.

3. The method as claimed in claim 1, wherein when measuring the temporal noise equivalent temperature difference using the responsivity function, the method comprises steps of:

setting a black body temperature of the black body radiation source at a lower temperature and an upper temperature, capturing 100 14-bit digital images from the IRFPA module, acquiring 64 image arrays from the 100 digital images at each of the lower temperature and the upper temperature, and after taking a temporal average of the 64 image arrays at each of the lower temperature and the upper temperature, acquiring a new image array and taking a spatial average of the new image array to get a mean responsivity value of the IRFPA module at each of the lower temperature and the upper temperature;

altering the black body temperature to the intermediate temperature and continuously capturing 100 images, and calculating a standard deviation of each pixel in the average images array to obtain a new image array representing a temporal noise value of each pixel in the IRFPA module;

dividing a difference between the mean responsivity values at the upper temperature and the lower temperature by a difference between the upper temperature and the lower temperature to generate a value of the SiTF; and dividing the temporal noise value of each pixel in the IRFPA module by the value of the SiTF to generate a temporal noise equivalent temperature difference value.

4. The method as claimed in claim 1, wherein when measuring the spatial noise equivalent temperature difference using the responsivity function, the method comprises steps of:

setting a black body temperature of the black body radiation source at a lower temperature, an intermediate temperature and an upper temperature, capturing 100 14-bit digital images from the IRFPA module, acquiring 64 image arrays at each of the lower temperature and the upper temperature, and after taking a temporal average of the 64 image arrays at each of the lower temperature and the upper temperature, acquiring a new image array and taking a spatial average of the new image array to get a mean responsivity value of the IRFPA module at each of the lower temperature and the upper temperature;

altering the black body temperature to the intermediate temperature and continuously capturing 100 images, taking the temporal average of the 100 images to obtain an average image array at the intermediate temperature, and calculating a standard deviation of the average image array to obtain a spatial noise value of the IRFPA module;

dividing a difference between the mean responsivity values at the upper temperature and the lower temperature by a difference between the upper temperature and the lower temperature to generate a value of the SiTF; and dividing the spatial noise value of the IRFPA module by the value of the SiTF to generate a spatial noise equivalent temperature difference value of the IRFPA module.

5. The method as claimed in claim 1, wherein when measuring the non-uniformity using the responsivity function, the method comprises steps of:

setting a black body temperature of the black body radiation source at an intermediate temperature between an upper temperature and a lower temperature upon two-point correction applied to the IRFPA module, and capturing 100 14-bit digital images from the IRFPA module; and taking a temporal average of the 100 digital images to obtain a new image array and calculating a mean value, a standard deviation of the new image array and the non-uniformity of the IRFPA module, wherein the non-uniformity is calculated by dividing the standard deviation by the mean value; and when measuring the operability, the method comprises steps of obtaining an operability value of the IRFPA module as a ratio of a value obtained by subtracting a number of bad pixels from a number of total pixels in the IRFPA module to the number of the total pixels in the IRFPA module.

6. A method for detecting bad pixels of an infrared focal plane array module, performed by an infrared imaging camera unit and a computer, wherein the infrared imaging camera unit has an infrared focal plane array (IRFPA) module and is connected to the computer, the infrared focal plane array module serves to detect a black body radiation source, and the computer serves to perform image division and analysis of performance parameters on images acquired by the infrared imaging camera unit, the method comprising steps of:

capturing continuous digital images from the IRFPA module;

performing image division on each of the continuous digital images to generate multiple divided digital images with each divided digital image corresponding to a response area of the continuous digital image;

measuring a gain value of each pixel in each divided digital image to generate a gain table associated with the divided digital image after two-point correction is applied to the IRFPA module; and defining a pixel in the IRFPA module as a bad pixel if a gain value in the gain table corresponding to the pixel is less than or equal to zero.

7. A method for detecting bad pixels of an infrared focal plane array module, performed by an infrared imaging camera unit and a computer, wherein the infrared imaging camera unit has an infrared focal plane array (IRFPA) module and is connected to the computer, the infrared focal plane array module serves to detect a black body radiation source, and the computer serves to perform image division and analysis of performance parameters on images acquired by the infrared imaging camera unit, the method comprising steps of:
- capturing continuous digital images from the IRFPA module;
- performing image division on each of the continuous digital images to generate multiple divided digital images with each divided digital image corresponding to a response area of the continuous digital image;
- measuring an offset value of each pixel in each divided digital image to generate an offset table associated with the divided digital image after two-point correction is applied to the IRFPA module; and
- defining a pixel in the IRFPA module as a bad pixel if an offset value in the offset table corresponding to the pixel is greater than an upper limit of a gray-level dynamic range of the IRFPA module or less than a lower limit of the gray-level dynamic range of the IRFPA module.

8. The method as claimed in claim 7, wherein a pixel in the IRFPA module is defined as a bad pixel when the offset value in the offset table corresponding to the pixel is greater than 16383 or less than −16383.

9. A method for detecting bad pixels of an infrared focal plane array module, performed by an infrared imaging camera unit and a computer, wherein the infrared imaging camera unit has an infrared focal plane array (IRFPA) module and is connected to the computer, the infrared focal plane array module serves to detect a black body radiation source, and the computer serves to perform image division and analysis of performance parameters on images acquired by the infrared imaging camera unit, the method comprising steps of:
- capturing continuous digital images from the IRFPA module;
- performing image division on each of the continuous digital images to generate multiple divided digital images with each divided digital image corresponding to a response area of the continuous digital image;
- measuring a temporal noise value of each pixel in each divided digital image;
- calculating a mean value of the temporal noise values of all the pixels in the divided digital image; and
- defining a pixel of the IRFPA module as a bad pixel if the temporal noise value of any pixel in the divided digital image corresponding to the pixel of the IRFPA module is greater than or equal to $\beta$ folds of the mean value.

10. The method as claimed in claim 9, wherein $\beta$ is 1.5, 2 or 2.5.

11. A method for detecting bad pixels of an infrared focal plane array module, performed by an infrared imaging camera unit and a computer, wherein the infrared imaging camera unit has an infrared focal plane array (IRFPA) module and is connected to the computer, the infrared focal plane array module serves to detect a black body radiation source, and the computer serves to perform image division and analysis of performance parameters on images acquired by the infrared imaging camera unit, the method comprising steps of:
- setting a black body temperature of the black body radiation source at a lower temperature, an intermediate temperature and an upper temperature, capturing 100 14-bit digital images from the IRFPA module, acquiring 64 image arrays at each of the lower temperature and the upper temperature, and after taking a temporal average of the 64 image arrays at each of the lower temperature and the upper temperature, acquiring a new image array and taking a spatial average of the new image array to get a mean responsivity value of the IRFPA module at each of the lower temperature and the upper temperature;
- altering the black body temperature to the intermediate temperature and continuously capturing 100 images, taking the temporal average of the 100 images to obtain an average image array at the intermediate temperature, and calculating a standard deviation of the average image array to obtain a spatial noise value of the IRFPA module; and
- defining a pixel of the IRFPA module as a bad pixel if the standard deviation of the pixel is beyond a range of the mean value $\pm\beta$*the standard deviation.

12. The method as claimed in claim 11, wherein $\beta$ is 0.5, 1 or 1.5.

* * * * *